United States Patent
Lee et al.

(10) Patent No.: US 7,061,198 B2
(45) Date of Patent: Jun. 13, 2006

(54) METHOD OF CONTROLLING BIPED WALKING ROBOT

(75) Inventors: Yong-kwun Lee, Suwon (KR); Joo-young Kwak, Seongnam (KR); Young Son, Yongin (KR); Yeon-taek Oh, Yongin (KR); Kyoung-sig Roh, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/885,900

(22) Filed: Jul. 8, 2004

(65) Prior Publication Data
US 2005/0029979 A1    Feb. 10, 2005

(30) Foreign Application Priority Data
Jul. 8, 2003    (KR) ................ 10-2003-0046206

(51) Int. Cl.
*B25J 5/00*    (2006.01)
(52) U.S. Cl. ..................... 318/568.12; 318/568.11; 318/568.12; 901/1
(58) Field of Classification Search ........... 318/568.12, 318/568.11; 901/1, 8; 700/245, 258, 260
See application file for complete search history.

(56) References Cited

U.S. PATENT DOCUMENTS

| | | | | |
|---|---|---|---|---|
| 5,355,064 A | | 10/1994 | Yoshino et al. ......... | 318/568.12 |
| 5,357,433 A | | 10/1994 | Takenaka et al. ...... | 364/424.02 |
| 5,426,586 A | * | 6/1995 | Ozawa ........................ | 701/23 |
| 5,432,417 A | * | 7/1995 | Takenaka et al. ...... | 318/568.12 |
| 5,459,659 A | * | 10/1995 | Takenaka ................... | 700/260 |
| 5,808,433 A | * | 9/1998 | Tagami et al. ......... | 318/568.12 |
| 5,872,893 A | * | 2/1999 | Takenaka et al. ........... | 700/245 |
| 5,936,367 A | * | 8/1999 | Takenaka ............... | 318/568.12 |
| 6,377,014 B1 | * | 4/2002 | Gomi et al. ........... | 318/568.12 |
| 6,832,132 B1 | * | 12/2004 | Ishida et al. ............... | 700/245 |
| 2005/0051368 A1 | * | 3/2005 | Takenaka et al. ............ | 180/8.6 |

FOREIGN PATENT DOCUMENTS

| | | |
|---|---|---|
| JP | 5-305586 | 11/1993 |
| JP | 5-318340 | 12/1993 |
| JP | 2000-254888 | 9/2000 |
| JP | 2001-79788 | 3/2001 |

(Continued)

OTHER PUBLICATIONS

Korean Intellectual Property Office, Notice of Official Action, Patent Application No. 10-2003-00-46206.

*Primary Examiner*—Rita Leykin
(74) *Attorney, Agent, or Firm*—Staas & Halsey LLP

(57) ABSTRACT

A method of controlling a biped walking robot to balance the robot based on a sensed ground reaction force. In the method, X and Y coordinates are assigned to positions of sensors attached to a sole of a leg of the robot and a corresponding Z coordinate is assigned for at least three of the sensors based on the sensed ground reaction force sensed by at the sensors, respectively. A ground reaction force plane is specified based on the sensed ground reaction force and a normal vector perpendicular to the ground reaction force plane is calculated. A roll angle about an X-axis and a pitch angle about a Y-axis are calculated and an actuator is driven in correspondence to the roll angle and the pitch angle to move a part of the robot to align the normal vector with a reference vector of the gravity direction.

8 Claims, 5 Drawing Sheets

FOREIGN PATENT DOCUMENTS

| | | |
|---|---|---|
| JP | 2002-326173 | 11/2002 |
| KR | 1998-027341 | 7/1998 |
| KR | 20-0220822 | 2/2001 |
| KR | 10-0291850 | 6/2001 |
| KR | 2001-0050543 | 6/2001 |
| KR | 20-0277575 | 5/2002 |
| KR | 2002-0086468 | 11/2002 |
| WO | 0 572 285 A1 | 12/1993 |

* cited by examiner

METHOD OF CONTROLLING BIPED WALKING ROBOT

CROSS-REFERENCE TO RELATED APPLICATIONS

This application claims the benefit of Korean Patent Application No. 2003-46206, filed Jul. 8, 2003, in the Korean Intellectual Property Office, the disclosure of which is incorporated herein by reference.

BACKGROUND OF THE INVENTION

1. Field of the Invention

The present invention relates to a method of controlling a biped walking robot, and more particularly, to a method of controlling a biped walking robot to walk stably with proper balance.

2. Description of the Related Art

In a conventional biped walking robot, walking pattern data (hereinafter, referred to as waking posture data) is previously input, and walking control is based on the walking posture data. Therefore, two legs are operated according to the walking control, so that a biped gait is achieved.

In the conventional biped walking robot, the biped gait is likely to be unstable according to ground conditions, physical parameters of the robot, etc. Further, sometimes the robot may fall.

The walking control may be based on a real-time situation of the robot without previously inputting the walking posture data. However, in spite of the real-time situations, the robot may fall because of an unexpected factor such as the ground condition, etc.

To make the biped gait stable, the robot is required to be compensated with a ZMP (zero moment point) in which the resultant moment of ground reaction force and gravity force acting on a sole of a robot foot is equal to zero. As an example of the ZMP compensation, there has been disclosed a control method for the ZMP compensation in Japanese Patent Publication No. 1993-305586, in which the ZMP compensation is achieved using compliance control by moving a robot upper body and by modifying a position on which the robot foot is put.

The ground reaction force acting on the robot foot is exemplarily measured by a strain gauge load cell in which a strain gauge is attached to an elastic body which may be strained by an external force, wherein the strain gauge forms a part of a Wheatstone bridge circuit. Here, the strain gauge load cell transforms the external force into an electric signal. However, such a load cell should be accurately manufactured and requires relatively many additional circuits, so that the strain gauge load cell is mainly employed for a structure receiving a relatively large force and is not suitable for a small structure such as a walking robot.

SUMMARY OF THE INVENTION

Accordingly, an aspect of the present invention is to provide a method of controlling a biped walking robot to walk stably, keeping a proper balance, in which a more efficient sensor is used and a ground reaction force plane is specified using a ground reaction force sensed by the sensor.

Additional aspects and/or advantages of the invention will be set forth in part in the description which follows and, in part, will be obvious from the description, or may be learned by practice of the invention.

The foregoing and/or other aspects of the present invention are achieved by providing a method of controlling a biped walking robot which has a main body, legs movably combined to lower opposite sides of the main body, and an actuator to drive the legs, and which controls the actuator to balance the robot based on a sensed ground reaction force. The method comprises assigning X and Y coordinates to positions of a plurality of sensors attached to a sole of the leg; assigning a Z coordinate to a value based on the sensed ground reaction force applied to at least three points of the sole of the leg; specifying a ground reaction force plane based on the sensed ground reaction force, and calculating a normal vector perpendicular to the ground reaction force plane; calculating a roll angle about an X-axis and a pitch angle about a Y-axis to align the normal vector with a reference vector of the gravity direction; and driving the actuator in response to the roll angle and the pitch angle.

According to an aspect of the invention, the sensor may comprise a film-type force sensor.

According to an aspect of the invention, the assigning of the coordinates to the sensors may comprise arranging the plurality of sensors on the sole of each leg at corners of a rectangle; and regarding an intersection of diagonal lines of the rectangle as an origin of a coordinate system.

According to an aspect of the invention, calculating the roll angle and the pitch angle includes calculating the roll angle by solving equation $$\theta x = \sin^{-1}\left(\frac{q}{\sqrt{q^2 + r^2}}\right);$$

and calculating the pitch angle by solving equation $$\theta y = \sin^{-1}\left(\frac{p}{\sqrt{p^2 + r^2}}\right),$$

where p, q and r are values of components of the normal vector perpendicular to the ground reaction force plane in the X, Y and Z directions, respectively.

BRIEF DESCRIPTION OF THE DRAWINGS

These and other aspects and/or advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
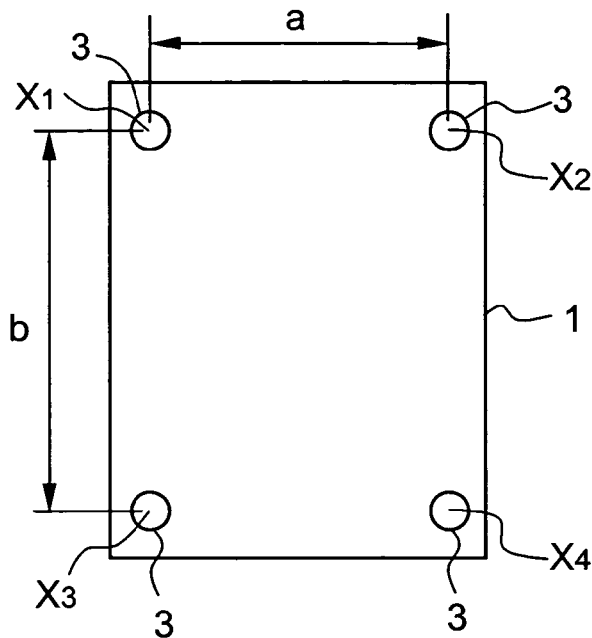
FIG. 1 illustrates an arrangement of sensors according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 illustrates arrangement of sensors according to the present invention. As shown therein, in a biped walking robot, sensors 3 are attached to respective corners of a sole 1 of a robot foot.

Preferably, each sensor 3 is a film-type force sensor, e.g., a force sensing resistor (FSR).

The FSR may be of a type which is commonly used as a digital switch for a calculator button, an elevator button, etc., in which changes in applied pressure are converted into changes in electrical resistance. That is, the FSR is a polymer thick film (PTF) device which exhibits a decrease in the resistance with any increase in force applied to an active surface thereof.

The FSRs are arranged at the respective corners of the sole 1 of the robot foot. Each FSR is covered with a circular rubber pad having a predetermined diameter, and then settled by a cover plate being attached to the sole 1. With this arrangement, the sole 1 of the robot foot is completely assembled, and precisely senses the load of the robot. By using the FSRs arranged at the corners of the sole 1 a cost of production is decreased as compared with using strain gauge load cells.

Thus, the biped walking robot according to the present invention employs the FSR which is inexpensive and adequate for a small structure such as a walking robot because an additional system required to collect information from the FSR is simple as compared with a system required to collect information from the conventional strain gauge load cell.

In FIGS. 2 through 6, a direction toward $X_1$ and $X_2$ indicates a forward direction and the robot stands on a surface or on ground inclining to the forward direction. FIGS. 2 through 6 illustrate an example of the posture of the robot, but the posture of the robot is not limited by the example shown. In FIGS. 2 through 6, $X_1$, $X_2$, $X_3$ and $X_4$ denotes three-dimensional coordinates in an XYZ-Cartesian coordinate system. Thus, where the Z coordinate is zero, $X_1$, $X_2$, $X_3$ and $X_4$ also may be considered to denote two-dimensional coordinates in an XY-plane.

Figure 2:
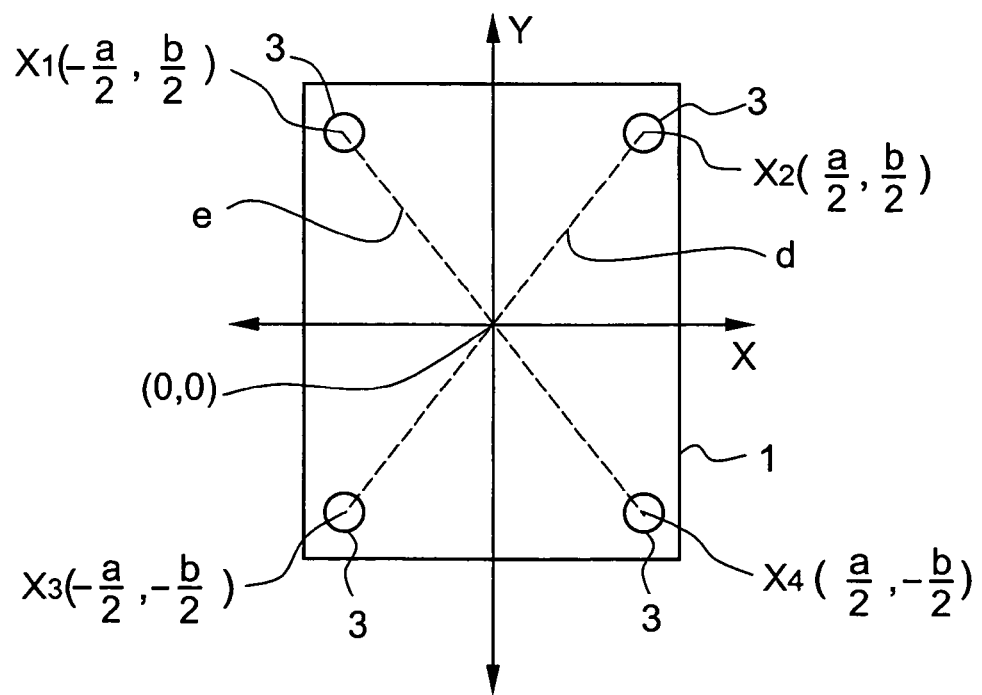
FIG. 2 illustrates an example of coordinates given to the arrangement of the sensors according to the present invention.

FIG. 2 illustrates coordinates an example of assigning coordinates to the sensors of FIG. 1. As shown therein, assuming that a distance between $X_1$ and $X_2$ is "a" as shown in FIG. 1, and a distance between $X_1$ and $X_3$ is "b" as shown in FIG. 1, and that the four sensors 3 are arranged on the sole 1 at corners of a rectangle, an intersection of two diagonal lines "d" and "e" of the rectangle is designated as an origin (0,0).

Further, where the coordinates (x, y) of $X_2$ are both positive, the coordinates of sensor 3 are as follows: $X_1$ (−a/2, b/2), $X_2$ (a/2, b/2), $X_3$ (−a/2, −b/2), and $X_4$ (a/2, −b/2).

In this embodiment, the intersection of the two diagonal lines "d" and "e" is regarded as the origin, and both the coordinates (x, y) of $X_2$ have the positive value. However, this arrangement is and example to aid in understanding the invention and is not intended to be limiting. The origin and the coordinates may be designated differently without departing from the scope of the invention.

Figure 3:
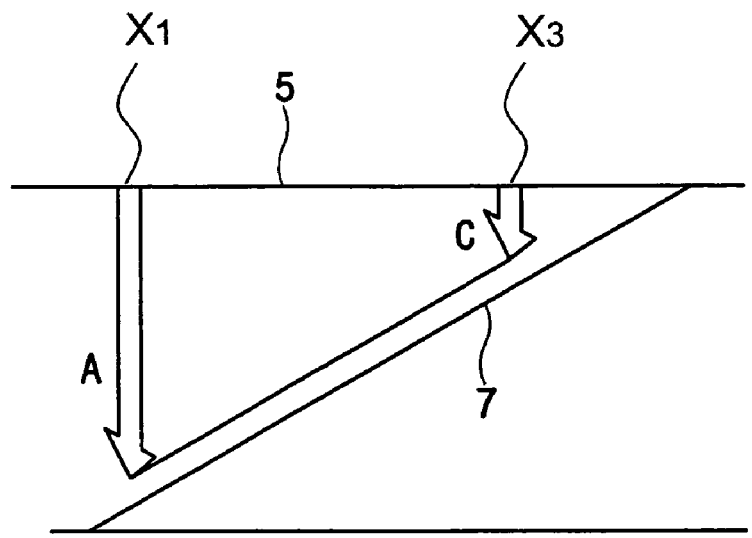
FIGS. 3 and 4 illustrate extracting a Z-coordinate of a ground reaction force plane according to the present invention.
Figure 4:
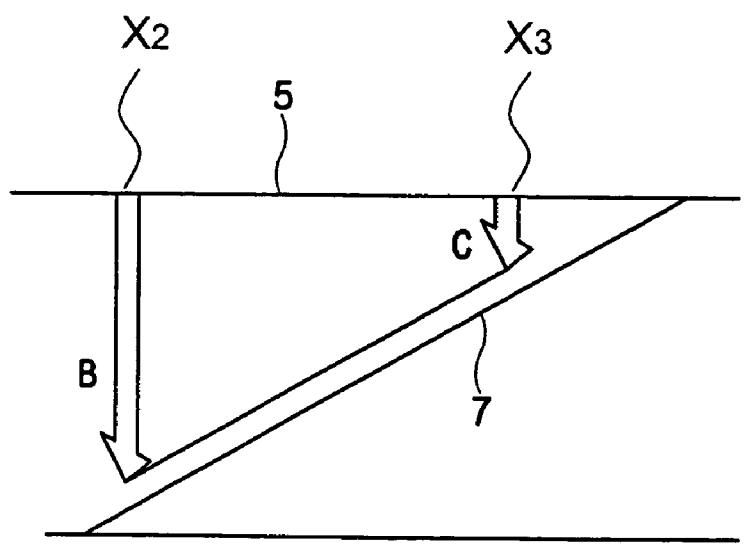
Figure 5:
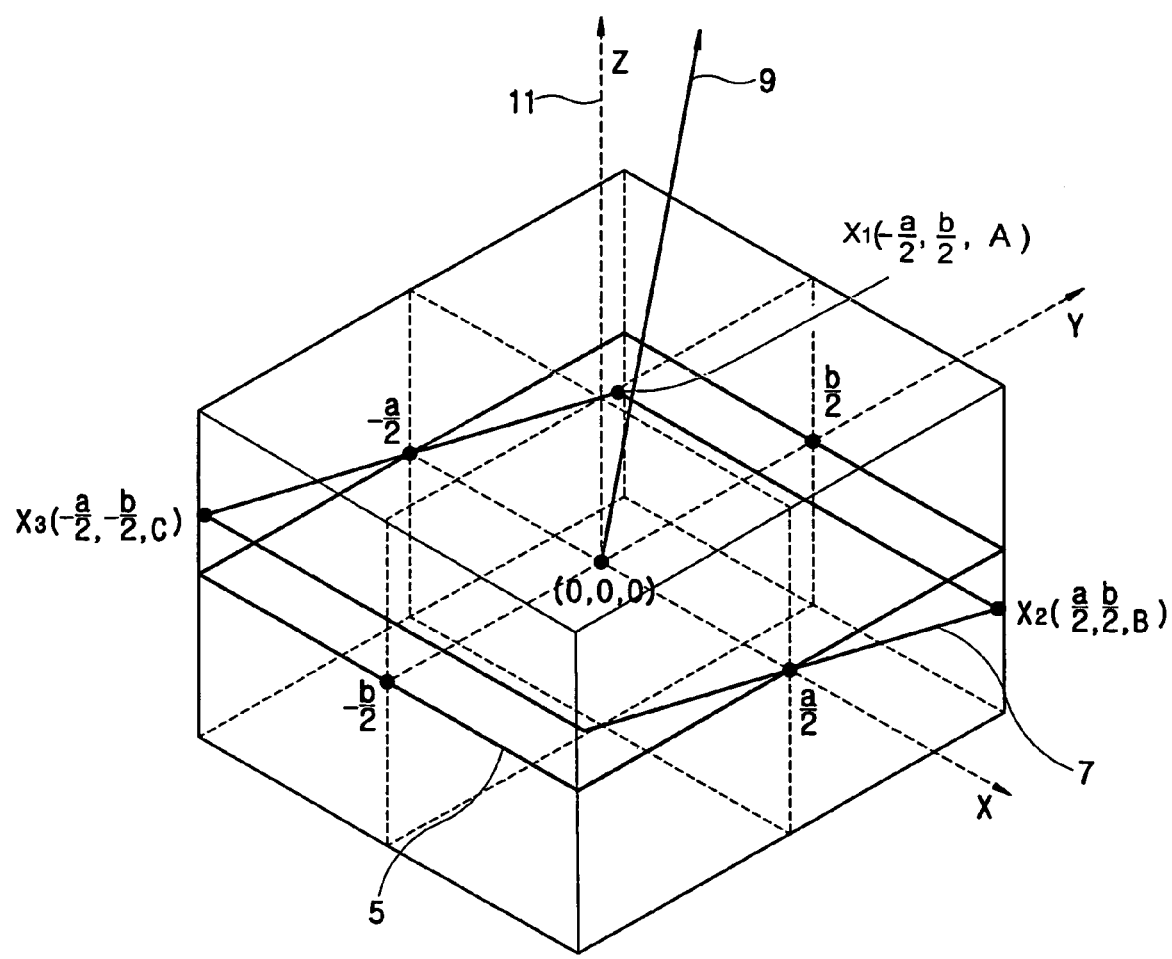
FIG. 5 illustrates a relationship between the ground reaction force plane, a normal vector, and a gravity vector, according to the present invention.

FIGS. 3 and 4 illustrate extracting a Z-coordinate to identify a ground reaction force plane according to the present invention, and FIG. 5 illustrates the ground reaction force plane according to the present invention.

In FIGS. 3 through 5, the reference numeral 5 indicates a horizontal plane perpendicular to a gravity direction and the reference numeral 7 indicates the ground reaction force plane. In FIG. 5, the reference numeral 9 indicates a normal vector perpendicular to the ground reaction force plane and the reference numeral 11 indicates a reference vector of the gravity direction. Further, in FIG. 3, a length of an arrow "A" represents a magnitude of the ground reaction force at $X_1$; in FIG. 4 a length of an arrow "B" represents a magnitude of the ground reaction force at $X_2$; and in FIGS. 2 and 3, a length of an arrow "C" represents a magnitude of the ground reaction force at $X_3$.

As is well known, a plane in a given coordinates system may be specified with three coordinates. In the same sense, the ground reaction force plane is specified on the basis of three coordinates corresponding to three of the sensors 3 selected from among four sensors 3. In this embodiment, the coordinates $X_1$, $X_2$ and $X_3$ excluding $X_4$ are used for specifying the ground reaction force plane, but the selected coordinates to specify the ground reaction force plane may vary as necessary.

In FIG. 3, arrows "A" and "C" illustrate the ground reaction forces at $X_1$ and $X_3$, respectively, in the Z-coordinate direction. Where the ground inclines to the forward direction, the forward ground reaction force "A" at $X_1$ is larger than the backward ground reaction force "C" at $X_3$. Here, the sensors sense the ground reaction forces at $X_1$ and $X_3$ and transmit electric signals corresponding to the forces at $X_1$ and $X_3$. The electric signals are converted into predetermined values and employed for analyzing the inclination of the ground. The electric signals transmitted from the sensor 3 are analyzed and then employed in identifying the ground reaction force plane parallel with the inclined ground.

Similarly, in FIG. 4 arrows "B" and "C" illustrate the ground reaction forces at $X_2$ and $X_3$, respectively in the Z-coordinate direction. In the case of the ground inclining to the forward direction, the forward ground reaction force "B" at $X_2$ is larger than the backward ground reaction force "C" at $X_3$. Here, the sensors sense the ground reaction forces at $X_2$ and $X_3$ and transmit the electric signals corresponding to the forces at $X_2$ and $X_3$. The electric signals are converted into predetermined values and employed for analyzing the inclination of the ground.

Thus, as shown in FIG. 5, the ground reaction force plane 7 including three points $X_1$, $X_2$ and $X_3$ is specified on the basis of the coordinates of the sensors 3 in the XYZ-Cartesian coordinates and the sensed ground reaction force. Further, the normal vector 9 perpendicular to the ground reaction force plane 7 may be calculated.

Here, an equation of the ground reaction force plane and an equation of the normal vector perpendicular to the ground reaction force plane is easily calculated using the coordinates of three points.

The normal vector 9 is substantially related to a lengthwise axis of a robot leg of the biped walking robot. Therefore, when the robot walks on the inclined ground such as the ground inclining to the forward direction as illustrated in FIGS. 3 through 5, the lengthwise axis of the robot leg should be parallel with the gravity direction so as to keep the robot balanced.

Hence, in order to align the calculated normal vector 9 perpendicular to the ground reaction force plane 7 with the reference vector 11 of the gravity direction, a compensating angle is calculated and then the robot leg is moved according to the compensating angle.

Figure 6:
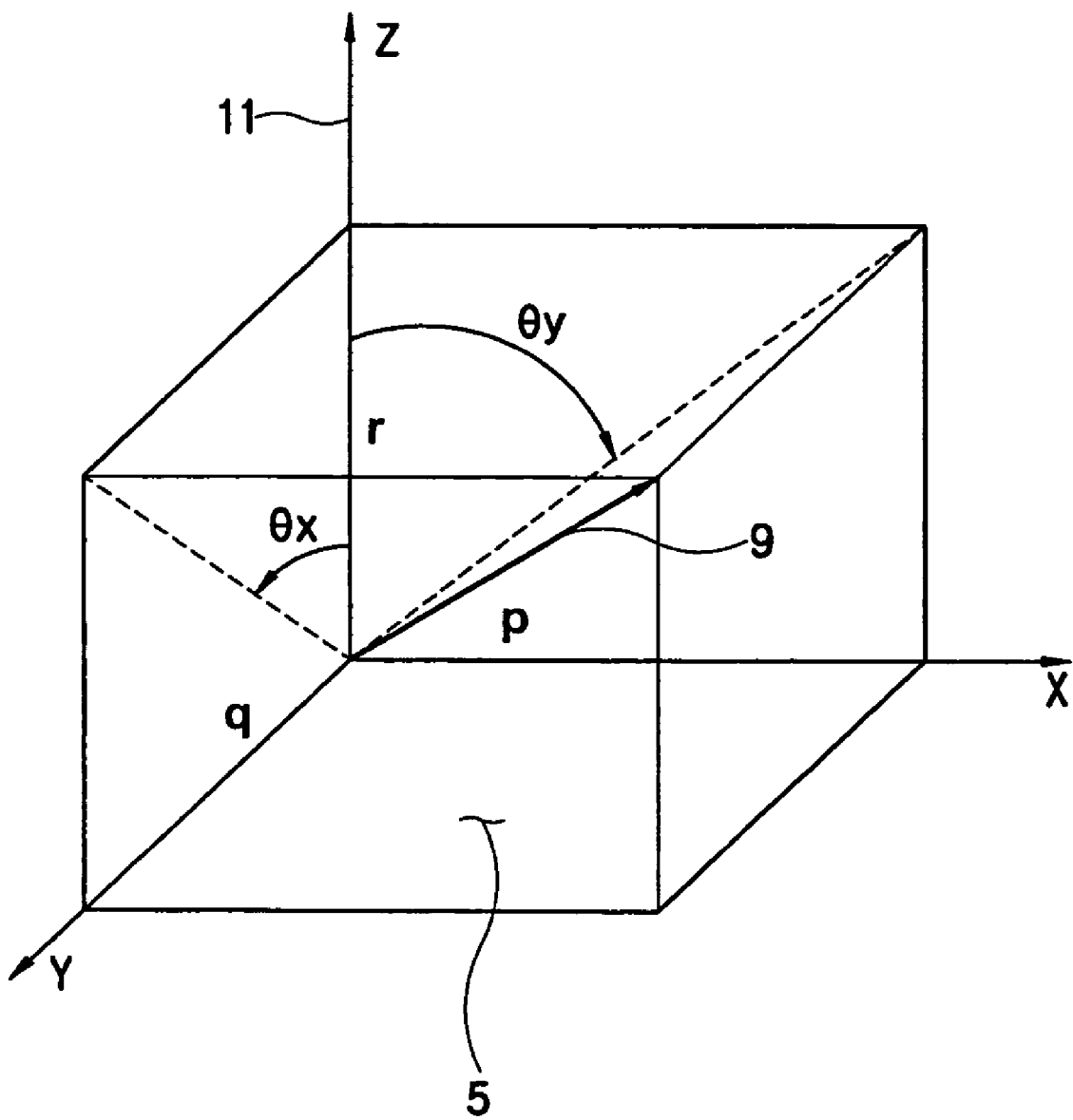
FIG. 6 illustrates a roll angle and a pitch angle according to the present invention.

Referring to FIG. 6 illustrating a roll angle and a pitch angle, the compensating angle is calculated as follows.

In FIG. 6, θx is a rotation angle of the normal vector 9 about the X-axis and is called a roll angle, and θy is a rotation angle of the normal vector 9 about the Y-axis and is called a pitch angle. Further, the lengths of "p", "q" and "r" indicate the magnitude of X, Y and Z-components of the normal vector 9, respectively.

As shown in FIG. 6, the roll angle θx is defined as an angle between a projection of the normal vector 9 on YZ plane and the Z-axis, and calculated according to equation (1).

$$\theta x = \sin^{-1}\left(\frac{q}{\sqrt{q^2 + r^2}}\right) \quad (1)$$

Similarly, the pitch angle θy is defined as an angle between a projection of the normal vector 9 on XZ plane and the Z-axis, and calculated according to equation (2).

$$\theta y = \sin^{-1}\left(\frac{p}{\sqrt{p^2 + r^2}}\right) \quad (2)$$

After calculating θx and θy, an actuator drives the axis of the robot leg to be aligned with the gravity direction on the basis of the calculated roll angle θx and the calculated pitch angle θy, i.e., the compensating angle.

Figure 7:
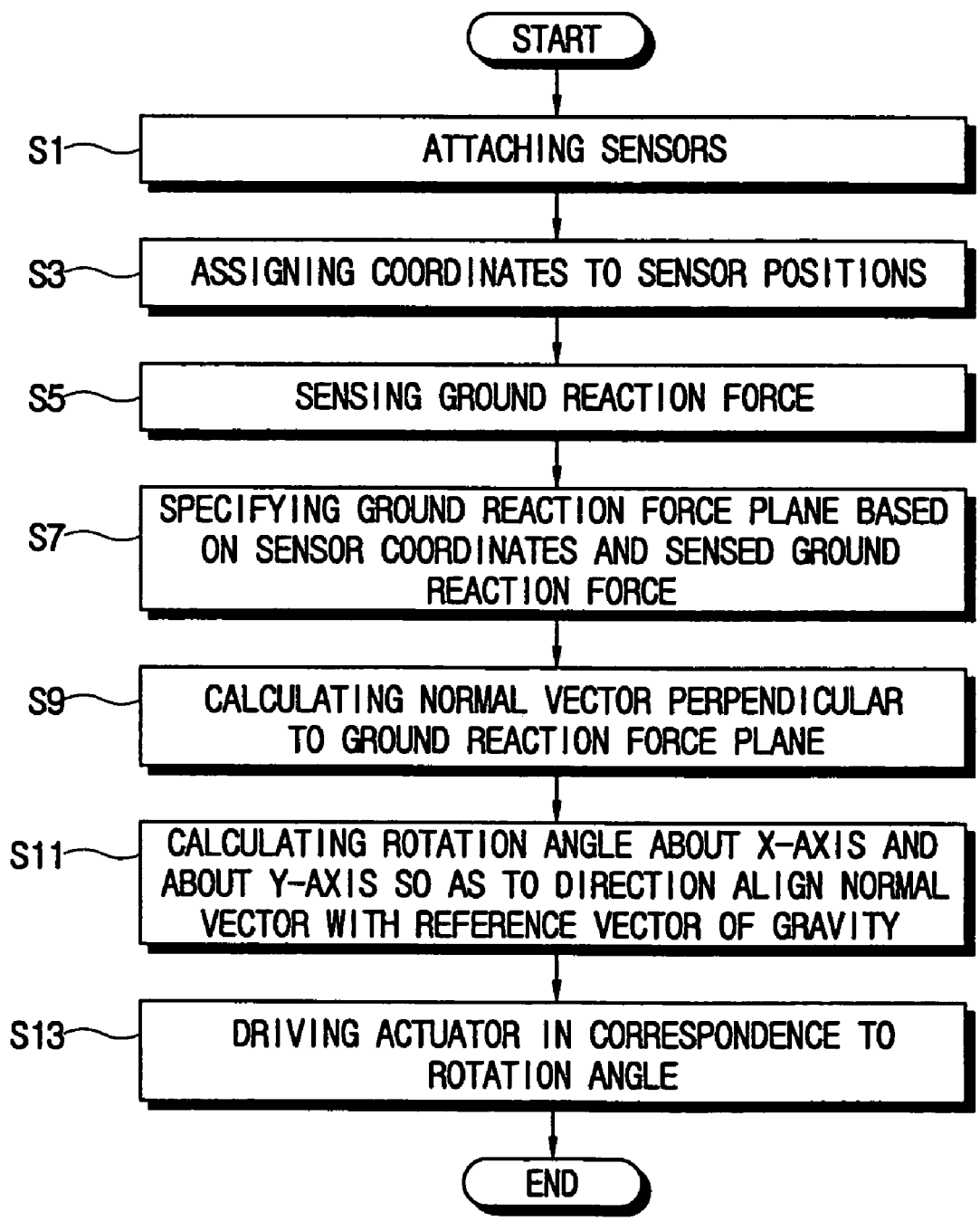
FIG. 7 is a flowchart of a method of controlling a biped walking robot according to the present invention.

FIG. 7 is a flowchart of a method of controlling a biped walking robot according to the present invention. As shown therein, at operation S1, the sensors 3 are attached to the sole 1 of the robot foot at corners, respectively. At operation S3, coordinates are assigned to every sensor. At operation S5, the sensors 3 sense the ground reaction force. At operation S7, the ground reaction force plane 7 is specified on the basis of the coordinates of the sensors 3 and the sensed ground reaction force. Here, the coordinates of each sensors 3 and the Z-coordinate corresponding to the sensed ground reaction force for a respective sensor may be represented as one three-dimensional coordinate in the XYZ-Cartesian coordinates. Further, at least three coordinates among such three-dimensional coordinates are used to specify one ground reaction force plane 7.

At operation S9, the normal vector 9 perpendicular to the ground reaction force plane 7 is calculated. At operation S11, the roll angle about the X-axis and the pitch angle about the Y-axis are calculated so as to align the normal vector 9 with the reference vector 11 of the gravity direction. Here, the roll angle and the pitch angle may be obtained by solving the equations (1) and (2) shown above.

At operation S13, the actuator drives the axis of the robot leg to be aligned with the gravity direction on the basis of the calculated roll angle and pitch angle, i.e., the compensating angle.

In the above-description, a joint which rotatably connects a calf, a knee and a main body each other is not described. However, the foregoing actuator generally includes a joint driving motor to drive the joint adjacent to the knee.

Here, the motor is properly controlled by a controller (not shown) on the basis of the calculated compensating angle, so that the biped walking robot is balanced while walking on the inclined ground.

In the above-described embodiment, the present invention is applied to the method of controlling the biped walking robot. However, the present invention, related to the method of calculating the compensating angle to keep balance by specifying the ground reaction force plane and using the normal vector perpendicular to the ground reaction force plane, is applicable to any system which needs balancing by attaching the sensor to at least three points and by measuring the ground reaction force.

With this configuration, the biped walking robot balances and walks stably using more efficient sensors and of specifying the ground reaction force plane based on the ground reaction force.

As described above, the present invention provides a method of controlling a biped walking robot to walk stably, while properly balancing, in which a more efficient sensor is used and a ground reaction force plane is specified using a ground reaction force sensed by the sensor.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a biped walking robot which has a main body, legs movably combined to lower opposite sides of the main body, and an actuator to drive the legs, and which controls the actuator to balance the robot based on a sensed ground reaction force, the method comprising:

assigning X and Y coordinates to respective positions of a plurality of sensors attached to a sole of the leg, each sensor sensing the ground reaction force at one of the respective positions;

assigning a Z coordinate value to each of the respective positions based on the sensed ground reaction force sensed at the respective position;

specifying a ground reaction force plane based on at least three of the assigned XYZ coordinates, and calculating a normal vector perpendicular to the ground reaction force plane;

specifying an XYZ coordinate system based on the positions of the plurality of sensors;

calculating a roll angle about the X-axis of the XYZ coordinate system and a pitch angle about the Y-axis of the XYZ coordinate system; and driving the actuator in correspondence to the roll angle and the pitch angle to align the normal vector with a reference vector of the gravity direction.

2. The method according to claim 1, wherein each of the plurality of sensors comprises a film-type force sensor.

3. The method according to claim 1, wherein the assigning the coordinates to the sensors comprises:

arranging the plurality of sensors on the sole of each leg, wherein one sensor is at each corner of a rectangle; and regarding an intersection of diagonal lines of the rectangle as an origin of the XYZ coordinate system.

4. The method according to claim 2, wherein assigning the coordinates to the sensors comprises: arranging the plurality of sensors on the sole of each leg, wherein one sensor is at each corner of a rectangle; and regarding an intersection of diagonal lines of the rectangle as an origin of the XYZ coordinate system.

5. The method according to claim 3, wherein calculating the roll angle and the pitch angle includes: calculating the roll angle by solving equation $$\theta x = \sin^{-1}\left(\frac{q}{\sqrt{q^2 + r^2}}\right);$$

and calculating the pitch angle by solving equation $$\theta y = \sin^{-1}\left(\frac{p}{\sqrt{p^2 + r^2}}\right),$$

where p, q and r are values of components of the normal vector perpendicular to the ground reaction force plane in the X, Y, and Z directions, respectively.

6. The method according to claim 4, wherein calculating the roll angle and the pitch angle includes: calculating the roll angle by solving equation $$\theta x = \sin^{-1}\left(\frac{q}{\sqrt{q^2 + r^2}}\right);$$

and calculating the pitch angle by solving equation $$\theta y = \sin^{-1}\left(\frac{p}{\sqrt{p^2 + r^2}}\right),$$

where p, q and r are values of components of the normal vector perpendicular to the ground reaction force plane, in the X, Y and Z directions, respectively.

7. A method of controlling a biped walking robot having a body, legs and feet, the method comprising:

assigning first and second coordinates of a coordinate system to each position of a plurality of sensors attached to a sole of at least one foot of the robot, each sensor sensing a ground reaction force at a respective one of the positions;

assigning a value of the sensed ground reaction force at each position as a third coordinate for the respective position;

specifying a ground reaction force plane based on at least three sets of the assigned first, second and third coordinates;

calculating a roll angle and a pitch angle based on the first, second and third coordinates, the coordinate system, and the specified ground reaction force plane; and controlling at least one leg of the robot based on a difference between the calculated roll and pitch angles and a reference vector of the gravity direction.

8. The method of claim 7, wherein the axes of the coordinate system pass through a point at an intersection of two lines extending between pairs of the sensors.

\* \* \* \* \*